United States Patent
Yang et al.

(10) Patent No.: US 9,550,257 B2
(45) Date of Patent: Jan. 24, 2017

(54) METHOD FOR MACHINING METALLIC MEMBER USING LATHING AND MILLING

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Tian-En Zhang, Jiashan (CN); Wei-Chuan Zhang, Jiashan (CN); Jian-Shi Jia, Jiashan (CN); Yang-Mao Peng, Jiashan (CN); Jian Qu, Jiashan (CN); Feng-Hua Chen, Jiashan (CN); Zhen-Guang Xu, Jiashan (CN); Jing-Shuang Sui, Jiashan (CN); Da-Qing Zhuang, Jiashan (CN); Jie Li, Jiashan (CN); Yi Liu, Jiashan (CN); Jian-Min Yu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 319 days.

(21) Appl. No.: 14/070,681

(22) Filed: Nov. 4, 2013

(65) Prior Publication Data
US 2014/0165372 A1 Jun. 19, 2014

(30) Foreign Application Priority Data

Dec. 19, 2012 (CN) .......................... 2012 1 0553531

(51) Int. Cl.
*B23P 13/02* (2006.01)
*B23P 23/02* (2006.01)

(52) U.S. Cl.
CPC ................ *B23P 13/02* (2013.01); *B23P 23/02* (2013.01); *Y10T 29/49996* (2015.01);
(Continued)

(58) Field of Classification Search
CPC ..... B23P 13/02; B23P 23/02; Y10T 29/49998; Y10T 29/5109; Y10T 29/5172; Y10T 29/5171; Y10T 29/5168; Y10T 29/5174; Y10T 29/5173; Y10T 29/49996
See application file for complete search history.

(56) References Cited

FOREIGN PATENT DOCUMENTS

CN 101959639 A 1/2011
DE 102009058649 A1 6/2011
(Continued)

*Primary Examiner* — John C Hong
(74) *Attorney, Agent, or Firm* — Zhigang Ma (57) ABSTRACT

A method for machining and finishing a metallic member to provide a finished product without any additional process uses a lathe and a milling process. A non-circular metallic member on a worktable is rotated, and lathe tool moved backwards and forwards to machine the peripheral top portion of the metallic member. The path of the lathe tool machines curved surfaces of the top portion of the metallic member. The rotation of the metallic member is then stopped, and a milling cutter is brought to meet the peripheral sidewall of the metallic member. The movement and feeding of the milling cutter is predetermined. The worktable rotates the metallic member to enable one end edge of the peripheral sidewall and then another to face the milling cutter, and have the end edge chamfered by the milling cutter.

19 Claims, 8 Drawing Sheets

(52) U.S. Cl.
CPC ...... *Y10T 29/49998* (2015.01); *Y10T 29/5109* (2015.01); *Y10T 29/5168* (2015.01); *Y10T 29/5171* (2015.01); *Y10T 29/5172* (2015.01); *Y10T 29/5173* (2015.01); *Y10T 29/5174* (2015.01)

(56) References Cited

FOREIGN PATENT DOCUMENTS

| | | |
|---|---|---|
| DE | 102011105402 A1 | 12/2012 |
| EP | 1952937 A1 | 8/2008 |
| JP | 57171280 * | 10/1982 |
| JP | 1-140935 A | 6/1989 |
| TW | M427230 U1 | 4/2012 |

* cited by examiner

METHOD FOR MACHINING METALLIC MEMBER USING LATHING AND MILLING

CROSS-REFERENCE TO RELATED APPLICATIONS

This application claims all benefits accruing under 35 U.S.C. §119 from China Patent Application No. 201210553531.4, filed on Dec. 19, 2012, in the China Intellectual Property Office, the disclosure of which is incorporated herein by reference. The application is also related to co-pending applications entitled, "METHOD FOR MACHINING METALLIC MEMBER USING LATHING AND MILLING" U.S. Appl. Ser. No. 14/070,671; "METHOD FOR MACHINING METALLIC MEMBER USING LATHING AND SCRAPING" U.S. Appl. Ser. No. 14/070,688; "METHOD FOR MACHINING METALLIC MEMBER USING LATHING AND SCRAPING" U.S. Appl. Ser. No. 14/070,694;"METHOD FOR MACHINING METALLIC MEMBER USING LATHING AND SCRAPING" U.S. Appl. Ser. No. 14/070,699; "MACHINE TOOL WITH LATHE TOOL AND MILLING CUTTER" U.S. Appl.Ser. No. 14/070,705; "MACHINE TOOL WITH LATHE TOOL AND SCRAPING CUTTER" U.S. Appl. Ser. No. 14/070,717; "MACHINE CONTROL SYSTEM EMPLOYING LATHE TOOL AND MILLING CUTTER" U.S. Appl. Ser. No. 14/070,722, "MACHINE CONTROL SYSTEM EMPLOYING LATHE TOOL AND SCRAPING CUTTER" U.S. Appl. Ser. No. 14/070,728, "MILLING METHOD FOR MACHINING METALLIC MEMBER" U.S. Appl. Ser. No. 14/070,736.

BACKGROUND

1. Technical Field

The present disclosure generally relates to methods for machining a metallic member, and particularly, to a method for machining member using lathing and milling.

2. Description of the Related Art

An electronic device such as a tabletop computer or a mobile phone may have a housing made of metal. The metallic housing includes a top portion and a peripheral sidewall extending from a peripheral edge of the top portion. The top portion has a greater surface area than that of the peripheral sidewall and has a non-circular flat surface or non-circular curved surface. The peripheral sidewall has four side surfaces arranged in order and adjacent two side surface connected by corners. In related manufacturing fields, if a milling process is employed to machine the metallic housing, some tracks occur on the top portion that has been a milled because of intermittent contact and interrupted milling by the milling cutter. Then a polishing process needs to be applied for a better appearance, thus the efficiency of the milling process is reduced. If a lathe process is adopted to machine the metallic member, it is difficult to machine a surface which is not circular. The lathe is not suitable to machine the peripheral sidewalls because of the four corners of the peripheral sidewall. Thus a number of additional machining processes must be added to machine the metallic housing.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
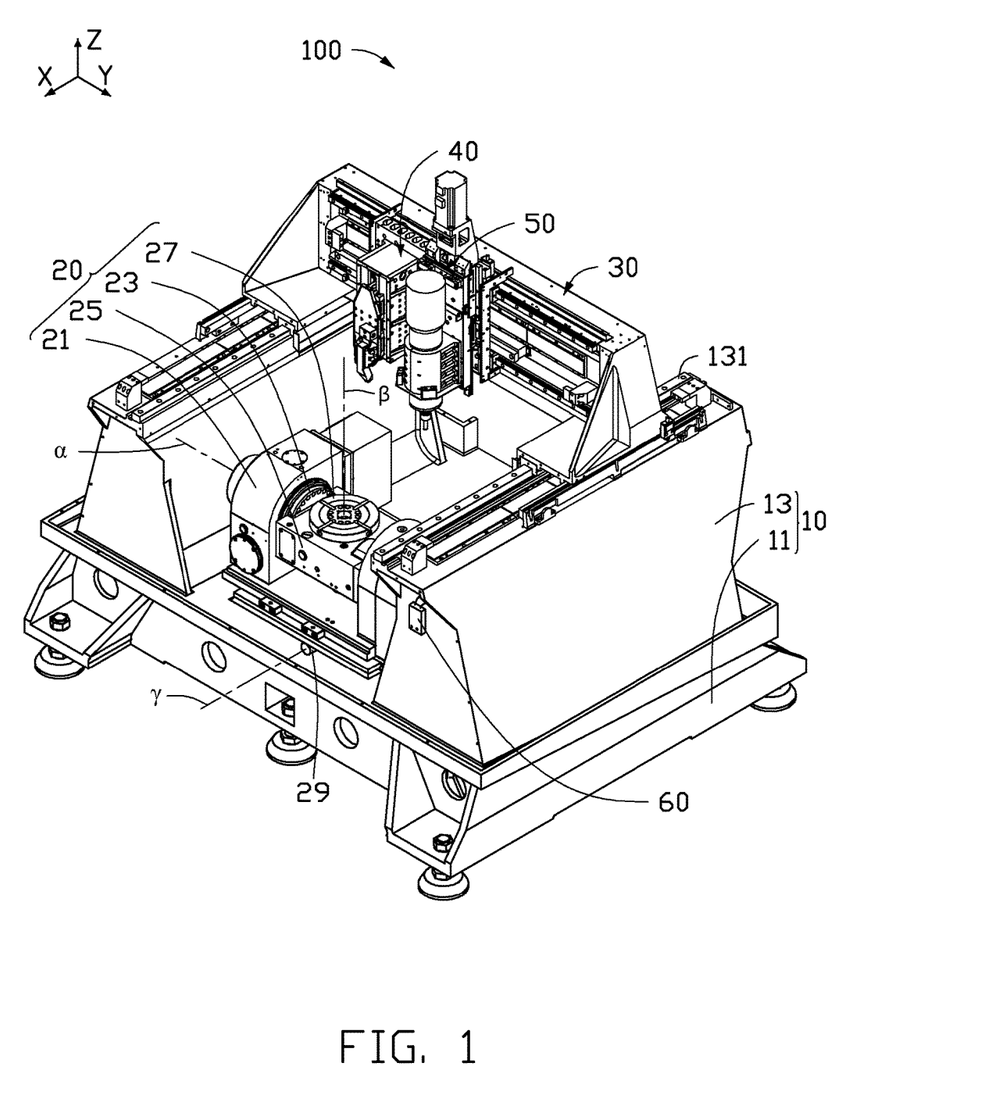
FIG. 1 is an isometric view of a first embodiment of a machine equipped with a lathe feeding mechanism and a milling feeding mechanism, and a worktable.
Figure 2:
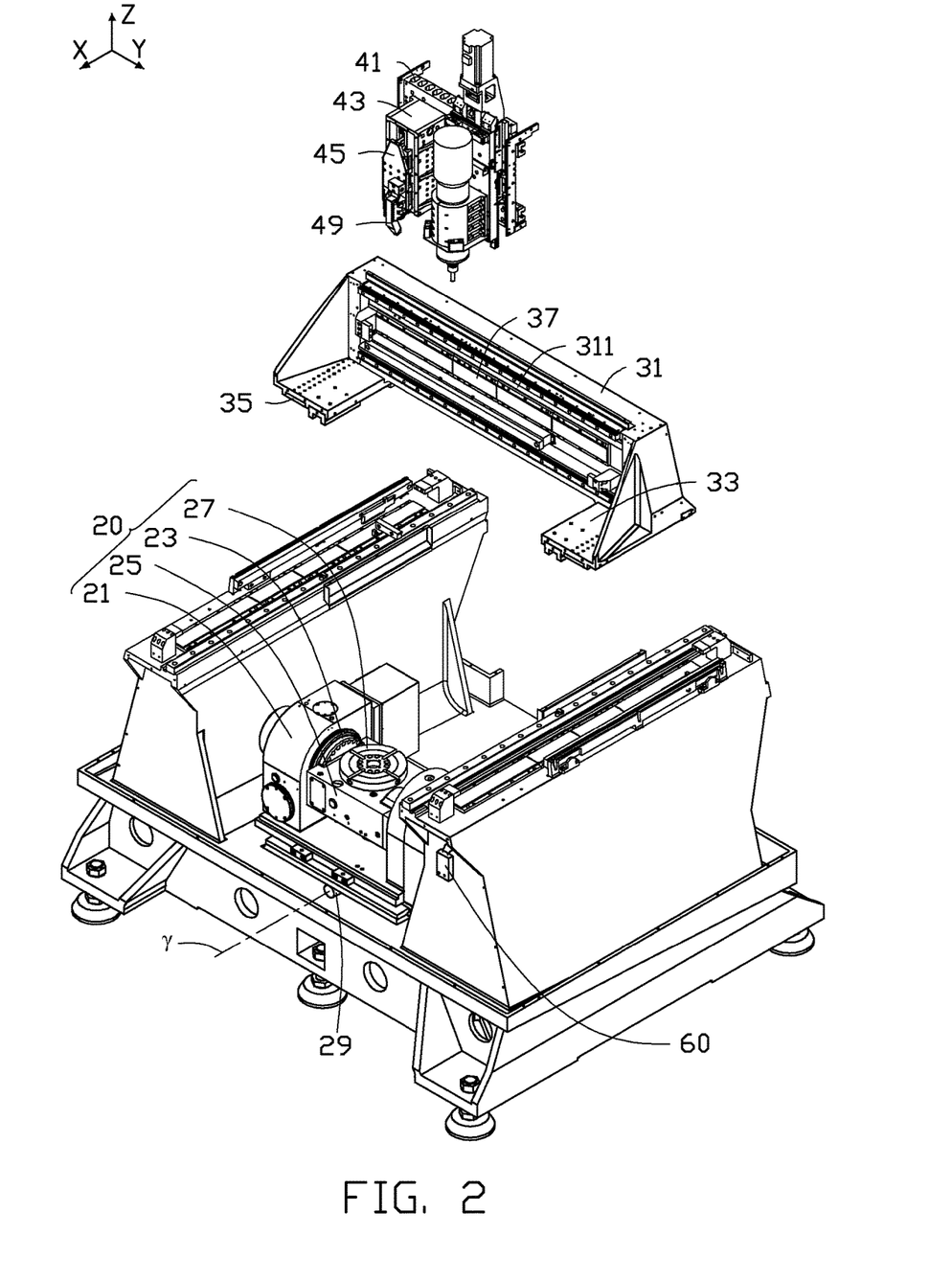
FIG. 2 is an exploded, isometric view of the machine of FIG. 1.
Figure 5:
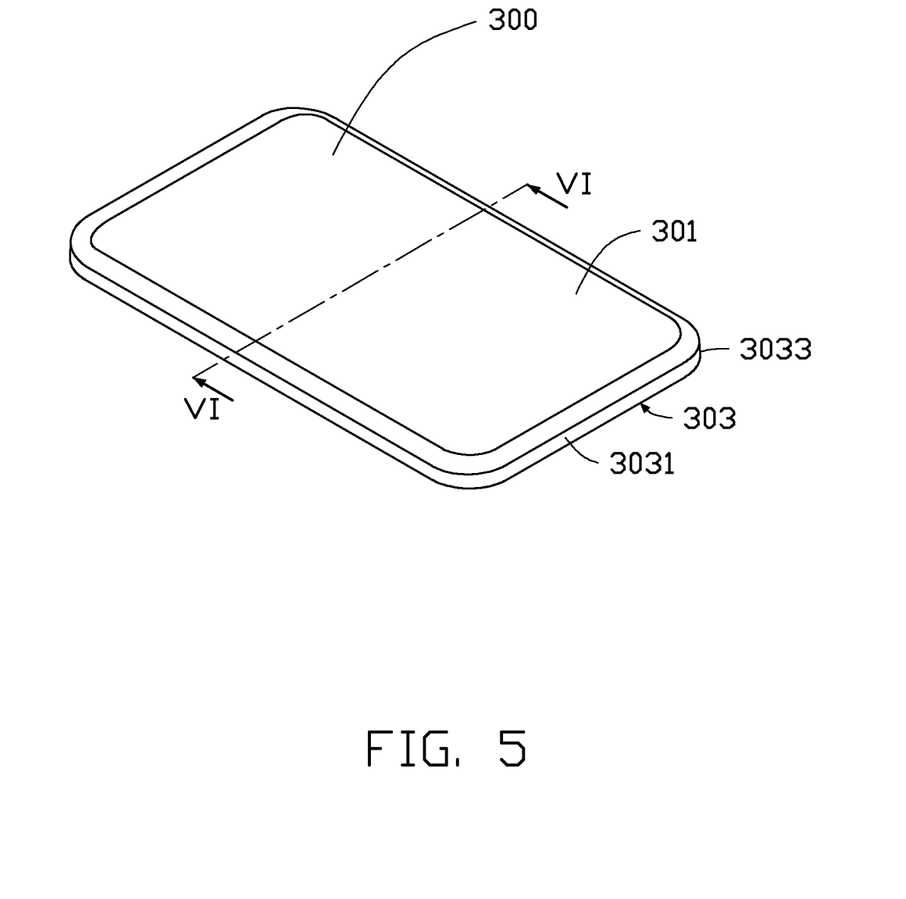
FIG. 5 is an isometric view of a metallic member to be machined.

FIGS. 1 and 2 show a first embodiment of a machine 100 adopting a milling method for machining a metallic member 300 (see FIG. 5). The machine 100 includes a machine support 10, a worktable 20, a moving device 30, a lathe feeding mechanism 40, a milling feeding mechanism 50, and a controller 60. The worktable 20 holds a workpiece in place and is supported by the machine support 10. The moving device 30 is movably positioned on the machine support 10 above the worktable 20. The lathe feeding mechanism 40 and the milling feeding mechanism 50 are arranged side by side and slidably mounted on the moving device 30. The controller 60 is electrically connected to the worktable 20, the moving device 30, the lathe feeding mechanism 40, and the milling feeding mechanism 50 for controlling the machine 100. Under the control of the controller 60, the moving device 30 can be driven to move with the lathe feeding mechanism 40 and the milling feeding mechanism 50, such that the lathe feeding mechanism 40 and the milling feeding mechanism 50 can be driven three-dimensionally along Cartesian coordinates, that is, along the X, the Y, and the Z axes.

The machine support 10 includes a base 11 and a pair of support bodies 13 positioned on the base 11. The pair of support bodies 13 is parallel to each other and arranged apart from each other. Each support body 13 includes a first sliding rail 131 on a surface away from the base 11. In the illustrated embodiment, the first sliding rail 131 extends substantially parallel to the X-axis (a first direction).

The worktable 20 is rotatably positioned on the base 11 between the two support bodies 13. The worktable 20 includes a pair of mounting bases 21, a first rotating member 23, a rotating shaft 25, and a second rotating member 27. The pair of mounting bases 21 is located in the middle portion of the base 11, in parallel. The pair of mounting bases 21 is located between the two support bodies 13. The first rotating member 23 is mounted on one mounting base 21. The rotating shaft 25 interconnects the first rotating member 23 and the other one mounting base 21. The first rotating member 23 is capable of rotating the rotating shaft 25 around an α axis. The α axis is parallel to the Y-axis but is not co-linear (a second direction). The second rotating member 27 is positioned on a middle portion of the rotating shaft 25, and capable of rotating the metallic member 300 placed thereupon around an β axis. The β axis is parallel to the Z-axis (a third direction) but is not co-linear. The first rotating member 23 and the second rotating member 27 are electrically connected to the controller 60. In the illustrated embodiment, the first rotating member 23 and the second rotating member 27 are direct drive motors.

The moving device 30 is slidably mounted on the pair of support bodies 13 and located above the worktable 20. The moving device 30 includes a cross beam 31, a pair of sliding bases 33, a pair of first driving mechanisms 35, and a second driving mechanism 37. The extending direction of the cross beam 31 is substantially parallel to the Y-axis. Opposite ends of the cross beam 31 are slidably positioned on the support bodies 13. The cross beam 31 includes a pair of second sliding rails 311 positioned on a side surface thereof and extending substantially parallel to the Y-axis. The pair of sliding bases 33 is installed on the opposite ends of the cross beam 31 to slidably connect with the first sliding rail 131. The first driving mechanism 35 is mounted on a surface of the sliding base 33 away from the cross beam 31 and located adjacent to an end of the first sliding rail 131. The pair of first driving mechanisms 35 is employed to drive the cross beam 31 to move along the X-axis direction.

The second driving mechanism 37 is mounted on the cross beams 31 to drive the lathe feeding mechanism 40 and the milling feeding mechanism 50 to move along the second sliding rails 311. The first driving mechanism 35 and the second driving mechanism 37 are electrically connected to the controller 60. In the illustrated embodiment, the first driving mechanisms 35 and the second driving mechanism 37 are linear motors with wonderful performance. In other embodiments, the first driving mechanisms 35 and the second driving mechanism 37 may be other drivers, such as hydraulic cylinders or rams. The number of the first driving mechanisms 35, and the second driving mechanism 37 may be set according to the application.

Figure 3:
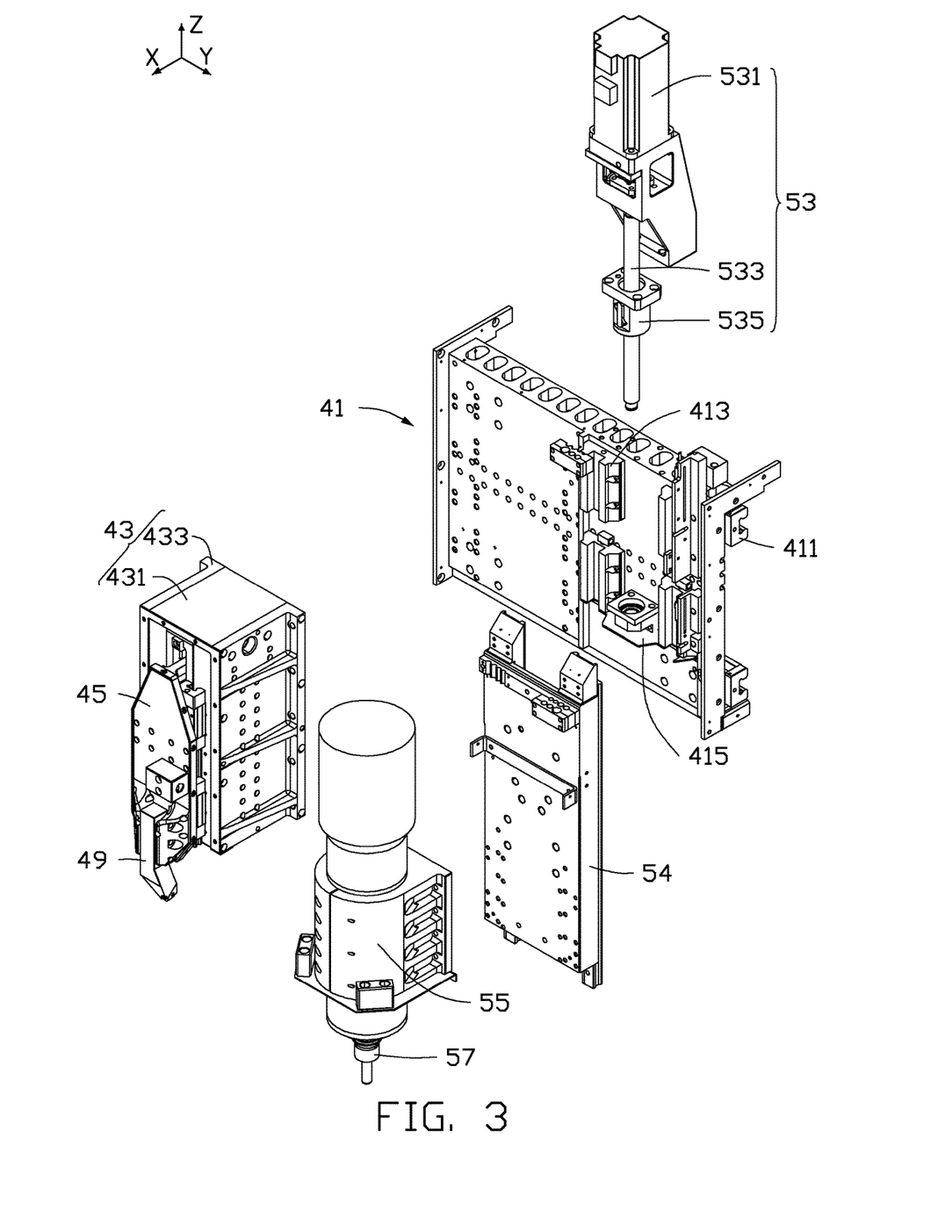
FIG. 3 is a partial, exploded, isometric view of the lathe feeding mechanism and the milling feeding mechanism of FIG. 2.
Figure 4:
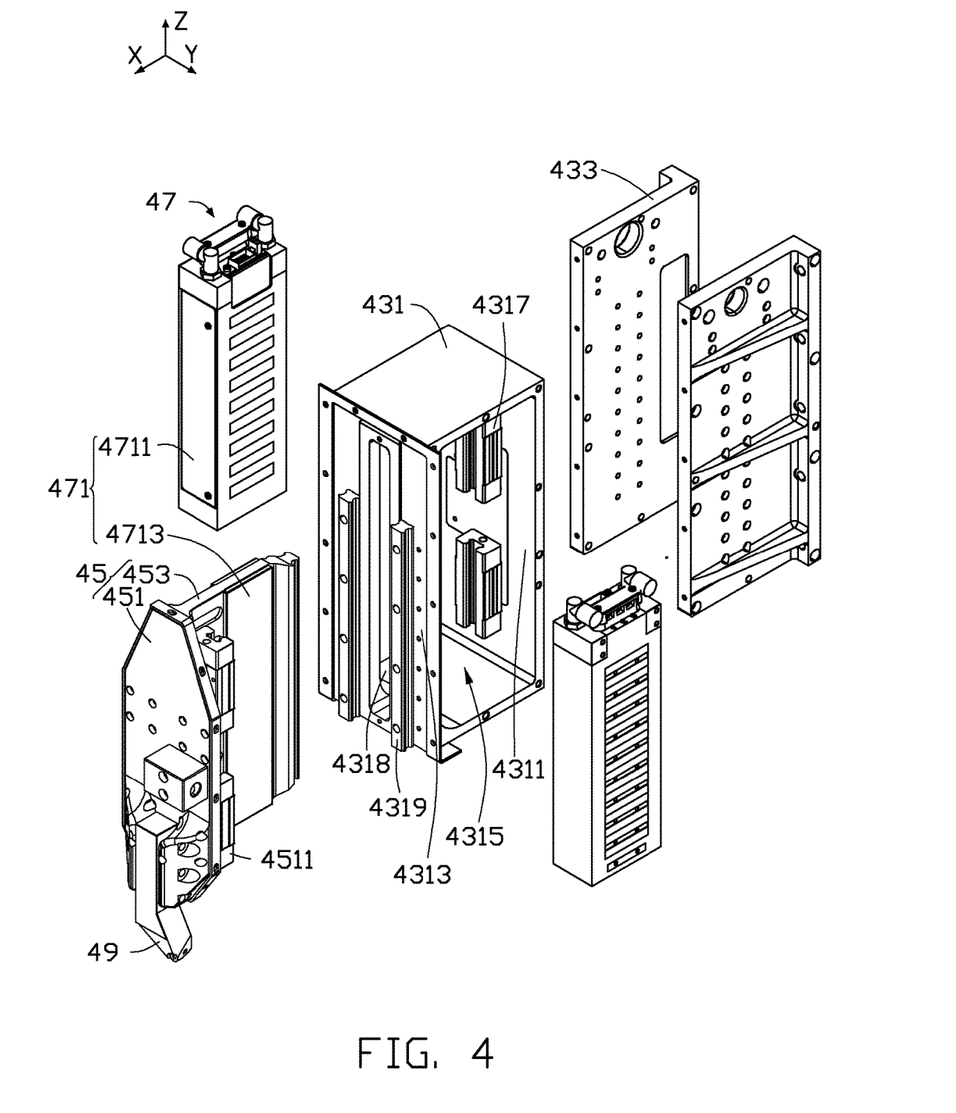
FIG. 4 is an exploded, isometric view of the lathe feeding mechanism of FIG. 3.

FIGS. 3 to 4 show the lathe feeding mechanism 40 slidably positioned on the cross beams 31. The lathe feeding mechanism 40 includes a sliding saddle 41 (see FIG. 2), a mounting seat 43, a tool holder 45, a pair of feeding assemblies 47, and a lathe tool 49. The sliding saddle 41 is assembled to the cross beams 31 and movably engages with the pair of second sliding rails 311. The sliding saddle 41 is driven by the second driving mechanism 37 to slide along the Y-axis direction together with the lathe feeding mechanism 40 and the milling feeding mechanism 50. The mounting seat 43 is fitted to the sliding saddle 41 away from the cross beam 31 and equipped with four guiding rails 413 extending along the Z-axis direction. The four guiding rails 413 are divided in two sets spaced from each other in pairs. The sliding saddle 41 further includes a mounting block 415 adjacent to the base 11. The mounting block 415 is located between the two sets of guiding rails 413. The mounting seat 43 is assembled to the sliding saddle 41 and spaced from the four guiding rails 413.

The mounting seat 43 includes a frame 431 and two mounting boards 433 assembled to opposite sides of the frame 431. The frame 431 includes a first side wall 4311 and a second side wall 4313. The first side wall 4311 and the second side wall 4313 are positioned substantially parallel to each other and cooperatively define a receiving space 4315. The first side wall 4311 is slidably connected with the sliding saddle 41. Two separate guiding portions 4317 protrude from an inner surface of the first side wall 4311 facing toward the second side wall 4315 and extending substantially parallel to the Z-axis. A through groove 4318 is defined in the second side wall 4313 and extends along a direction substantially parallel to the Z-axis corresponding to the guiding portions 4317. Two sliding portions 4319 protrude from an outer surface of the second side wall 4313 at two sides of the through groove 4318. In the illustrated embodiment, the sliding portions 4319 are sliding rails, and the frame 431 is integrally formed. The two mounting boards 433 are installed on opening sides of the frame 431. Each mounting board 433 is connected substantially perpendicularly to the first wall 4311 and the second side wall 4313 to close the two opening sides of the frame 431.

The tool holder 45 slidably connects with the mounting seat 43. The tool holder 45 is substantially "T" shaped, and includes a main body 451 and a sliding board 453 protruding substantially perpendicularly from the main body 451. The main body 451 is a bar of material tapering at both ends, and positioned outside of the mounting seat 43. Two distanced holding portions 4511 are positioned on a surface of the main body 451 facing the sliding board 453. The two holding portions 4511 slidably engage with the pair of sliding portions 4319 of the mounting seat 43. The sliding board 453 passes through the through groove 4318 and is slidably assembled to the two guiding portions 4317, dividing the receiving space 4315 into two parts.

The pair of feeding assemblies 47 is mounted in the mounting seat 43, and includes two drivers 471 electrically connected to the controller 60. The two drivers 471 are capable of driving the tool holder 45 into reciprocating motion at high speed along the direction of the Z-axis, relative to the guiding portions 4317 and the sliding portions 4319. The two drivers 471 are received in the receiving space 4315 and positioned on two sides of the sliding board 453. In the illustrated embodiment, the drivers 471 are linear motors. Each driver 471 includes a forcer 4711 and a stator 4713. Each forcer 4711 is fixed to a surface of each of the mounting boards 433. The sliding board 453 is positioned between the two forcers 4711. The two stators 4713 are positioned on the opposite surfaces of the sliding board 453. In other embodiments, the number of drivers 471 may be set according to application. For example, the two drivers 471 can replace a more powerful single driver, or three or more drivers can be positioned to drive the tool holder 45 to maximize the available power, and the assembly of the drivers is simpler.

The lathe tool 49 is fixedly assembled to the main body 451 of the tool holder 4511 adjacent to the base 11.

The milling feeding mechanism 50 includes a linear driving assembly 53, a linking board 54, a rotatable driving member 55 and a milling cutter 57. The linear driving assembly 53 includes a driving member 531, a screw leading rod 533, and a nut 535. The driving member 531 is mounted on the sliding saddle 43 above the cross beam 31. The screw leading rod 533 interconnects the driving member 531 and the mounting block 415. The nut 535 is sleeved on the screw leading rod 533 and engages with the screw leading rod 533. The linking board 54 is slidably assembled to the two sets of guiding rails 413 and fixed to the nut 535. The rotatable driving member 55 is assembled to a side surface of the linking board 54 opposite to the screw leading rod 533. The milling cutter 57 is mounted on an end of the rotatable driving member 55 adjacent to the base 11.

The driving member 531 is capable of rotating the screw leading rod 533 and drives the linking board 54, the rotatable driving member 55, and the milling cutter 57 to slide along Z-axis direction. The rotatable driving member 55 is capable of rotating the milling cutter 57 against the metallic member 300. The milling cutter 57 is driven by the cross beam 31 to move along the X-axis direction or the Y-axis direction, and driven by the linear driving assembly 53 to move along Z-axis direction.

In assembly, the worktable 20 is positioned between the two support bodies 13. The cross beam 31 is installed on the two support bodies 13 via the pair of sliding bases 33. The pair of first driving mechanisms 35, and the second driving mechanism 37 are mounted on the base 11 and the cross beam 31 respectively. The lathe feeding mechanism 40 and the milling feeding mechanism 50 are mounted to the cross beam 31 side by side. The worktable 20, the moving device 30, the lathe feeding mechanism 40, and the milling feeding mechanism 50 are electrically connected to the controller 60.

Figure 6:
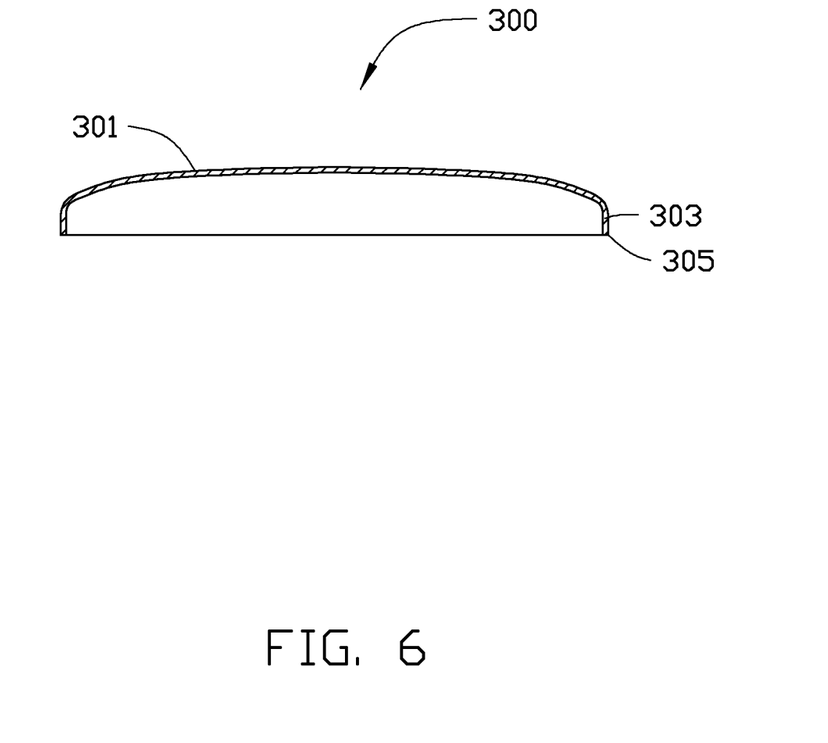
FIG. 6 is a sectional view of the metallic member of FIG. 5, taken along line VI-VI of FIG. 5.

Referring to FIGS. 5 and 6, the metallic member 300 to be machined is a housing of a tablet computer or a mobile phone. The metallic member 300 is substantially rectangular, and includes a top portion 301 and a peripheral sidewall 303 extending from a peripheral edge of the top portion 301. The top portion 301 has a curved surface with a relatively greater surface area than that of the peripheral sidewall 303. In the embodiment, the peripheral sidewall 303 has four side surfaces 3031 arranged in order and every two of the adjacent side surfaces 3031 are connected by a corner 3033. The four side surfaces 3031 are substantially flat surfaces, each corner 3033 interconnects two adjacent side surfaces 3031. The peripheral sidewall 303 further includes an end edge 305 away from the top portion 301.

Figure 7:
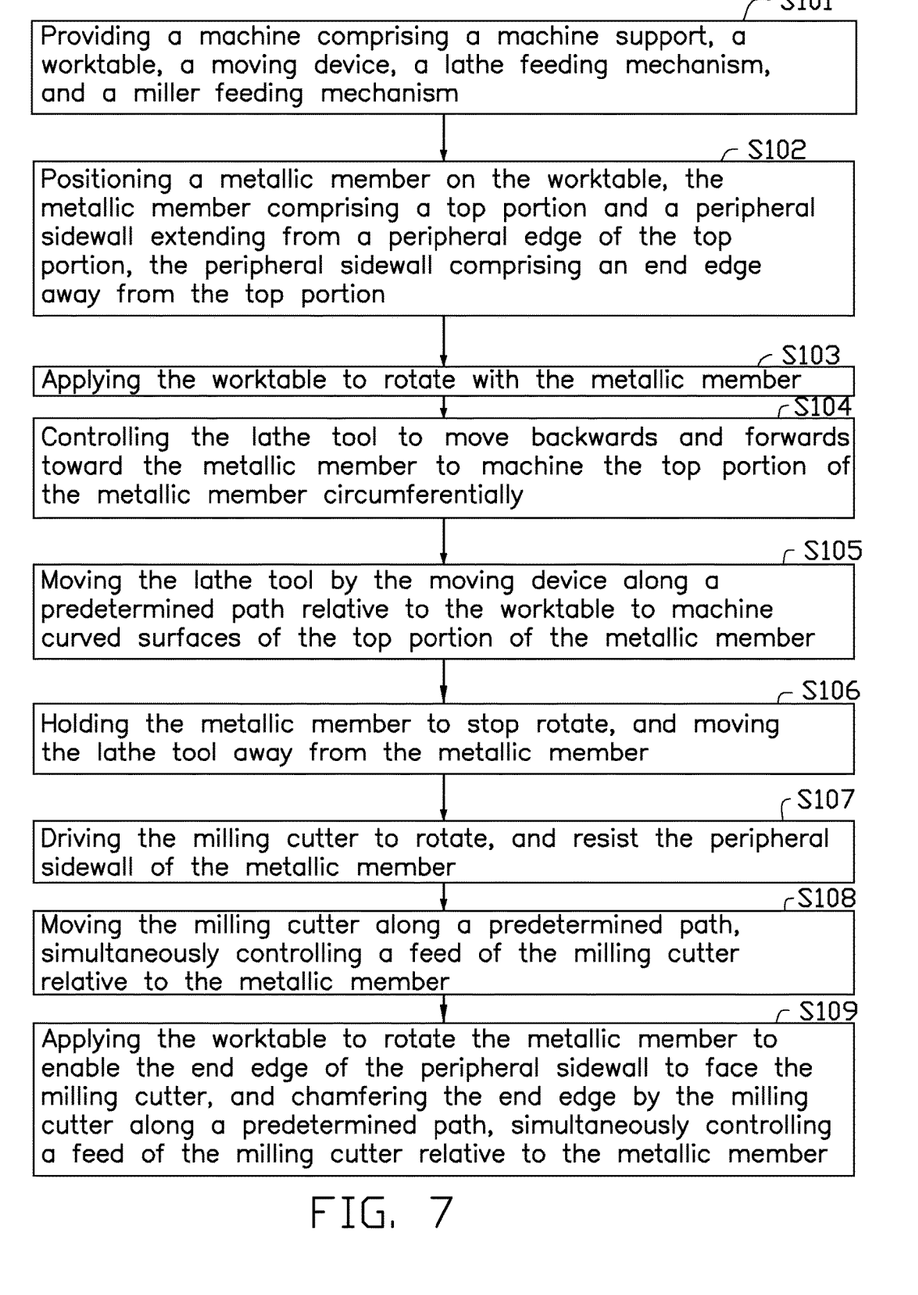
FIG. 7 is a flow chart of a first embodiment of the method for machining the metallic member.

Referring to FIG. 7, an embodiment of a method for machining the metallic member includes steps as follows:

In step S101: a machine 100 is provided, the machine 100 includes a worktable 20, a lathe feeding mechanism 40, and a milling feeding mechanism 50, the lathe feeding mechanism 40 includes a lathe tool 49, and the milling feeding mechanism 50 includes a milling cutter 57. In the embodiment, the machine 100 is provided as previously described.

In step S102: a metallic member 300 is placed and held on the worktable 20 of the machine 100. The metallic member 300 includes a top portion 301 and a peripheral sidewall 303 extending from a peripheral edge of the top portion 301, the peripheral sidewall 303 includes an end edge 305 away from the top portion 301.

In step S103: the worktable 20 drives the metallic member 300 to rotate. In the embodiment, the metallic member 300 is driven by the second rotating member 27 to rotate around the β axis;

In step S104: the lathe feeding mechanism 40 drives the lathe tool 49 to machine the top portion 301 of the metallic member 300 with a high frequency reciprocating motion. In detail, firstly, the pair of first driving mechanisms 35 drives the cross beam 31 to slide along the X-axis, until the lathe tool 49 arrives at an end of a side of the top portion 31. The second driving mechanism 37 drives the lathe feeding mechanism 40 to move along the Y-axis, until the lathe tool 49 arrives at a middle of the side of the top portion 31, the lathe tool 49 the reaching an original position above the worktable 20 for machining. Finally, the pair of feeding assemblies 47 drives the lathe tool 49 to move backwards and forwards at a high speed along the Z-axis according to the depth of cutting required for each machining portion of the top portion 301, to machine the rotary metallic member 300 circumferentially.

In step S105: the lathe feeding mechanism 40 moves along a predetermined path relative to the worktable 20. The first driving mechanism 25 drives the feeding mechanism 40 to move along the X-axis via the cross beam 31, such that the rotary lathe tool 49 moves radially across the rotary metallic member 300 for machining curved surfaces on the top portion 301, until the lathe tool 49 arrives at a rotational center of the metallic member 300.

In step S106: the worktable 20 stops the metallic member 300 rotating, and the lathe tool 49 moves away from the metallic member 300. That is, the second rotating member 27 stops the rotating motion, to hold the metallic member 300 still, and the lathe feeding mechanism 40 drives the lathe tool 49 to leave the worktable 20.

In step S107: the milling feeding mechanism 50 drives the milling cutter 57 to rotate and contact the peripheral sidewall 303 of the metallic member 300. In detail, firstly, the pair of first driving mechanisms 35 drives the cross beam 31 to slide along the X-axis, and the second driving mechanism 37 drives the lathe feeding mechanism 40 to move along the Y-axis, such that the milling cutter 57 moves toward one first sliding rail 131 and arrives at a position above an end of one side surface 3031 of the peripheral sidewall 303. Secondly, the rotatable driving member 55 drives the milling cutter 57 to rotate. Finally, the linear driving assembly 53 drives the milling cutter 57 to slide along the two sets of guiding rails 413 until the milling cutter 57 meets the peripheral sidewall 303 of the metallic member 300.

In step S108: the milling feeding mechanism 50 moves along a predetermined path and controls a feed of the milling cutter 57 relative to the metallic member 300. In detail, the pair of first driving mechanisms 35 drives cross beam 31 to slide along the X-axis to enable the milling cutter 57 to mill the one side surface 3031 of the peripheral sidewall 303. When milling of the side surface 3031 is finished, the milling cutter 57 arrives at the corner 3033. At this time, the second rotating member 27 rotates the metallic member 300 around the β axis until a side surface 3031 which is adjacent to the milled side surface 3031 is rotated to milling cutter 57 and arranged parallel to the first sliding rail 131.

In the rotating process, the milling cutter 57 is driven by the pairs of the first driving mechanisms 35 and the second driving mechanisms 37 to change position relative to the metallic member 300, and the milling cutter 57 machines the corner 3033 during the rotation. When the next side surface 3031 of the peripheral sidewall 303 is rotated to a position parallel to the pair of first sliding rail 131, the pair of first driving mechanisms 35 drives the cross beam 31 to slide along the X-axis to enable the milling cutter 57 to mill the next side surface 3031. During the milling, feeding mechanism 50 moves along the predetermined path, the rotatable driving member 55 controls a feed of the milling cutter 57 relative to the metallic member 300 along the Z-axis direction. In another embodiment, the metallic member 300 is fully fixed, thus when the milling cutter 57 arrives at the corner 3033, it is driven by the pairs of the first driving mechanisms 35 and the second driving mechanisms 37 to change position relative to the metallic member 300. During the rotating process, the milling cutter 59 machines the corner 3033 until it arrives at the next side surface 3031 of the metallic member 300. Then the milling cutter 57 mills the next side surface 3031 of the peripheral sidewall 303 by a similar process.

In step S109: the worktable 20 rotates the metallic member 300 to enable the end edge 305 of the peripheral sidewall 303 to face the milling cutter 57, the milling feeding mechanism 50 chamfers the end edge 305 along a predetermined path and controls a feed of the milling cutter 57 relative to the metallic member 300. In detail, the first rotating member 23 rotates the metallic member 300 along the α axis upward to enable the end edge 305 on one side surface 3031 to face the milling cutter 57, the milling feeding mechanism 50 chamfers the end edge 305. When finishing chamfering the end edge 305 on one side surface 3031, the first rotating member 23 rotates the metallic member 300 along the α axis downward, the second rotating member 27 rotates the metallic member 300 along the β axis to change position of the metallic member 300 relative to the milling cutter 57, until the milling cutter 57 arrives at a side surface 3031 adjacent to the side surface 3031 which has the milled end edge 305, then the first rotating member 23 rotates the metallic member 300 along the α axis upward to enable the end edge 305 on the next side surface 3031 to face the milling cutter 57, such that the milling cutter 57 chamfers the end edge 305 without interruption and with no intermittent contact. A third rotating member 29 may be employed to rotate the metallic member 300 along a γ axis perpendicular to the α and the β axis, the γ axis is parallel to the third direction. The first rotating member 21 is assembled to the third rotating member 29. When chamfering, the first rotating member 23 rotates the metallic member 300 along the α axis upward to enable the end edge 305 on one side surface 3031 to face the milling cutter 57, the milling feeding mechanism 50 chamfers the end edge 305, and when finishing the chamfering of the end edge 305 on one side surface 3031, the first rotating member 23 rotates the metallic member 300 along the α axis downward, then the milling cutter 57 moves to a next side surface 3031, the third rotating member 29 rotates the metallic member 300 along the γ axis to change position of the metallic member 300 relative to the milling cutter 57, until the end edge 305 on the adjacent surface 3031 faces the milling cutter 57, then the milling feeding mechanism 50 is able to chamfer the end edge 305 on the next side surface 3031. In the embodiment, the metallic member 300 does not need to rotate along the β axis. The worktable 20 drives the metallic member 300 to rotate, for presentation to the milling cutter 57 for machining other portions of the metallic member 300.

When only the peripheral sidewall 303 of the metallic member 300 needs to be machined, step 103 to step 106 may be omitted. The milling feeding mechanism 50 chamfers the end edge 305 of the metallic member 300 firstly and then carries out milling of the peripheral sidewall 303.

Figure 8:
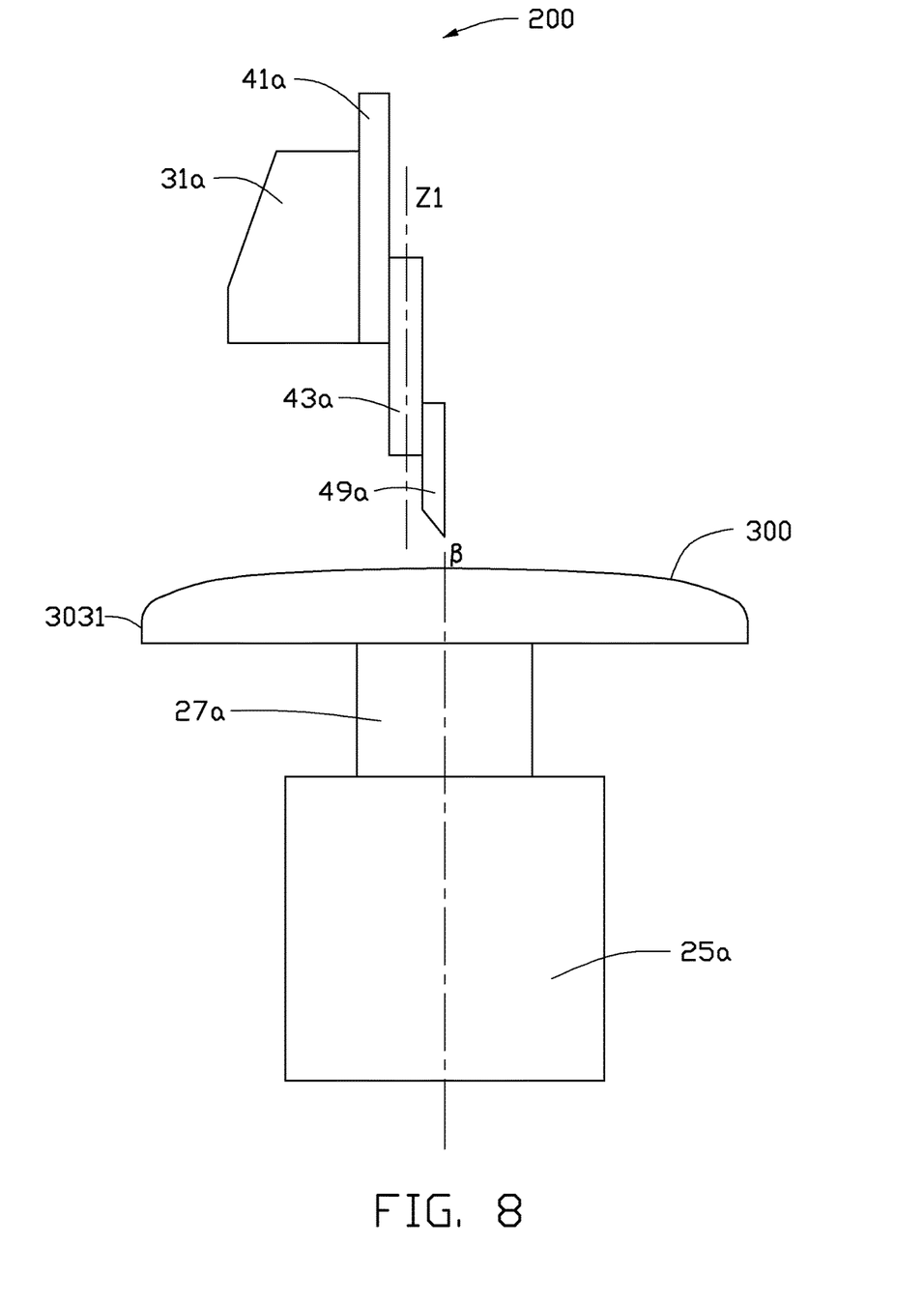
FIG. 8 is a schematic view of a second embodiment of the machine with a part removed.

Referring to FIG. 8, a second embodiment of machine 200 is employed in a second embodiment of method for machining the metallic member 300. The machine 200 is similar to the machine 100 in structure, save that a sliding saddle 41a is slidably assembled to a cross beam 31a, and a second rotating member 27a is mounted on a rotating shaft 25a. The metallic member 300 is placed and held on the second rotating member 27a. The difference between the machines 100/200 is that, a mounting seat 43a of the machine 200 is slidably mounted on the sliding saddle 41a and capable of sliding along the Z1-axis direction relative to the sliding saddle 41a, and a lathe tool 49 is slidably mounted on the mounting seat 43a.

When the lathe feeding mechanism 40 is to machine the top portion 301 of the metallic member 300, the pair of first driving mechanisms 35 drive the cross beam 31 to slide along the X-axis, and the second driving mechanism 37 drives the lathe feeding mechanism 40 to move along the Y-axis, such that the lathe tool 49 arrives at an original position above the worktable 20 for machining. The original position is located at a middle of a side of the top portion 301. Then the mounting seat 43a drives the lathe tool 49 to move downwardly along the Z1-axis to reach a preset position near the metallic member 300. Finally, the pair of feeding assemblies 47 drives the lathe tool 49 to move backwards and forwards at a high speed along the Z-axis according to the depth of cutting required for each machining portion of the top portion 301, to machine the rotary metallic member 300 circumferentially. Because the mounting seat 43a can slide along the Z1-axis to place the lathe tool 49 at the preset position, a reciprocating distance of movement of the lathe tool 49 relative to the metallic member 300 can be reduced, thereby enhancing a reaction response of the lathe tool 49.

Accordingly, in the second embodiment of the method for machining the metallic member 300, after driving the cross beam 31 to slide along the Y-axis by the second driving mechanisms 37, a sub-step of moving the mounting seat 43a downward along the Z1-axis direction to reach a preset position is interposed.

The milling feeding mechanism 50 mills the peripheral sidewall 303 and chamfers the end edge 305 of the metallic member 300 before the lathe feeding mechanism 40 machines the top portion 301. The milling feeding mechanism 50 is not assembled to the sliding saddle 41, but is assembled to a sliding plate (not shown) slidably mounted on the pair of second guiding rails 311, such that the lathe feeding mechanism 40 and the milling feeding mechanism 50 may be controlled independently.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A milling method for machining metallic member using lathing and milling, comprising:
   (1) providing a machine comprising a machine support, a worktable, a moving device, a lathe feeding mechanism, and a milling feeding mechanism, wherein the worktable is positioned on the machine support; the moving device is slidably assembled to the machine support along a first direction and located above the worktable, the lathe feeding mechanism and the milling feeding mechanism are slidably assembled to the moving device along a second direction perpendicular to the first direction, the lathe feeding mechanism comprises at least one feeding assembly and a lathe tool connected to the at least one feeding assembly, the at least one feeding assembly is configured for driving the lathe tool to move along a third direction substantially perpendicular to the first and second direction reciprocally, the milling feeding mechanism comprises a milling cutter and is configured for driving the milling cutter to move along the third direction, the worktable comprises a first rotating member and a second rotating member, the first rotating member is mounted on the machine support, the second rotating member is mounted on the first rotating member, the second rotating member is capable of rotating the metallic member along the third direction, thereby cooperates with the lathe tool;
   (2) positioning a metallic member on the worktable, the metallic member comprising a top portion and a peripheral sidewall extending from a peripheral edge of the top portion, the peripheral sidewall comprising an end edge away from the top portion;
   (3) applying the worktable to rotate with the metallic member;
   (4) controlling the lathe tool to move backwards and forwards toward the metallic member to machine the top portion of the metallic member circumferentially;

(5) moving the lathe tool by the moving device along a predetermined path relative to the worktable to machine curved surfaces of the top portion of the metallic member;
(6) holding the metallic member to stop rotate, and moving the lathe tool away from the metallic member;
(7) driving the milling cutter to rotate and contact the peripheral sidewall of the metallic member;
(8) moving the milling cutter along a predetermined path, simultaneously controlling a feed of the milling cutter relative to the metallic member; and
(9) applying the worktable to rotate the metallic member to enable the end edge of the peripheral sidewall to face the milling cutter, and chamfering the end edge by the milling cutter along a predetermined path, simultaneously controlling a feed of the milling cutter relative to the metallic member.

2. The method of claim 1, wherein the peripheral sidewall comprises a plurality of side surfaces arranged in order and adjacent two of the plurality of side surfaces is connected by a corner, step (8) further comprises when the milling cutter finishes milling one side surface, the milling cutter arrives at one corner of the peripheral sidewall, the moving device drives the milling tool mechanism to move along the first direction and the second direction to adjust a position of the milling cutter relative to the metallic member, until the milling cutter arrives at an adjacent side surface to the side surface that has been milled, and followed by repeating the machining steps on the adjacent side surface.

3. The method of claim 1, wherein in the step (9), the first rotating member rotates the metallic member along the second direction upward to enable the end edge on one side surface to face the milling cutter, the milling feeding mechanism chamfers the end edge, when finishing chamfering the end edge on one side surface, the first rotating member rotates the metallic member along the second direction downward, the second rotating member rotates the metallic member along the third direction to change position of the metallic member relative to the milling cutter, until the milling cutter arrives at an adjacent side surface to the side surface which the milled end edge located on, then the first rotating member rotates the metallic member along the second direction upward to enable the end edge on the adjacent side surface to face the milling cutter, such that the milling cutter chamfers the end edge.

4. The method of claim 1, wherein the worktable further comprises a third rotating member, the first rotating member is mounted on the third rotating member, in the step (9), the first rotating member rotates the metallic member along the second direction upward to enable the end edge on one side surface to face the milling cutter, the milling feeding mechanism chamfers the end edge, when finishing chamfering the end edge on one side surface, the first rotating member rotates the metallic member along the second direction downward, then the milling cutter moves to an adjacent side surface to the side surface which the milled end edge located on, the third rotating member rotates the metallic member along the first direction upward, until the end edge on the adjacent surface face the milling cutter, such that the milling cutter chamfers the end edge.

5. The method of claim 1, the worktable comprises a pair of mounting bases and a rotating shaft, the pair of mounting bases is spaced from each other and mounted on the machine support, the first rotating member is mounted on one mounting base, the rotating shaft interconnects the first rotating member and the other mounting base, the second rotating member is mounted on rotating shaft, the first rotating member is capable of rotating the rotating shaft, thereby rotating the second rotating member and the metallic member along the third direction.

6. The method of claim 1, wherein in step (4), the moving device firstly drives lathe tool to move along the first direction until the lathe tool arrives at an end of a side of the top portion of the metallic member, and then the moving device drives lathe tool to move along the second direction until the lathe tool arrives at a middle of the side of the top portion of the metallic member, then the lathe tool moves backwards and forwards toward the metallic member to machine the top portion of the metallic member, in step (5) the moving device moves the lathe tool along the first direction till the lathe tool arrives at a rotating center of the metallic member.

7. The method of claim 6, wherein the lathe feeding mechanism further comprises a sliding saddle and a mounting seat fittingly assembled to the sliding saddle, the sliding saddle is slidably connected to the moving device along the second direction, the at least one feeding assembly is received in the mounting seat, and the milling cutter is slidably mounted on the mounting seat.

8. The method of claim 6, wherein the lathe feeding mechanism further comprises a sliding saddle and a mounting seat, the sliding saddle is slidably connected to the moving device along the second direction, the mounting seat is slidably mounted on the sliding saddle along a fourth direction substantially parallel to the third direction, the at least one feeding assembly is received in the mounting seat, and the milling cutter is mounted on the mounting seat; step (4) further comprises after the lathe tool arrives at the metallic member, the mounting seat is controlled to drive the lathe tool to move along the fourth direction to reach a preset position near the metallic member, then the lathe toll moves backwards and forwards.

9. The method of claim 1, wherein the milling feeding mechanism comprises a linear driving assembly mounted on the moving device, the linear driving assembly drives the milling cutter to move along the third direction to adjust the feed of the milling cutter relative to the metallic member.

10. A milling method for machining metallic member using lathing and milling, comprising:
(1) providing a machine comprising a machine support, a worktable, a moving device, a lathe feeding mechanism, and a milling feeding mechanism, wherein the worktable is positioned on the machine support; the moving device is slidably assembled to the machine support along a first direction and located above the worktable, the lathe feeding mechanism and the milling feeding mechanism are slidably assembled to the moving device along a second direction perpendicular to the first direction, the lathe feeding mechanism comprises at least one feeding assembly and a lathe tool connected to the at least one feeding assembly, the at least one feeding assembly is configured for driving the lathe tool to move along a third direction substantially perpendicular to the first and second direction reciprocally, the milling feeding mechanism comprises a milling cutter and is configured for driving the milling cutter to move along the third direction, the milling feeding mechanism comprises a linear driving assembly mounted on the moving device, the linear driving assembly drives the milling cutter to move along the third direction to adjust the feed of the milling cutter relative to the metallic member;
(2) positioning a metallic member on the worktable, the metallic member comprising a top portion and a peripheral sidewall extending from a peripheral edge of the top portion, the peripheral sidewall comprising an end edge away from the top portion;

(3) applying the worktable to rotate with the metallic member;

(4) controlling the lathe tool to move backwards and forwards toward the metallic member to machine the top portion of the metallic member circumferentially;

(5) moving the lathe tool by the moving device along a predetermined path relative to the worktable to machine curved surfaces of the top portion of the metallic member;

(6) holding the metallic member to stop rotate, and moving the lathe tool away from the metallic member;

(7) driving the milling cutter to rotate and contact the peripheral sidewall of the metallic member;

(8) moving the milling cutter along a predetermined path, simultaneously controlling a feed of the milling cutter relative to the metallic member; and (9) applying the worktable to rotate the metallic member to enable the end edge of the peripheral sidewall to face the milling cutter, and chamfering the end edge by the milling cutter along a predetermined path, simultaneously controlling a feed of the milling cutter relative to the metallic member.

11. The method of claim 10, wherein the peripheral sidewall comprises a plurality of side surfaces arranged in order and adjacent two of the plurality of side surfaces is connected by a corner, step (8) further comprises when the milling cutter finishes milling one side surface, the milling cutter arrives at one corner of the peripheral sidewall, the moving device drives the milling tool mechanism to move along the first direction and the second direction to adjust a position of the milling cutter relative to the metallic member, until the milling cutter arrives at an adjacent side surface to the side surface that has been milled, and followed by repeating the machining steps on the adjacent side surface.

12. The method of claim 10, wherein the worktable comprises a first rotating member and a second rotating member, the first rotating member is mounted on the machine support, the second rotating member is mounted on the first rotating member, the second rotating member is capable of rotating the metallic member along the third direction, thereby cooperates with the lathe tool.

13. The method of claim 12, wherein in the step (9), the first rotating member rotates the metallic member along the second direction upward to enable the end edge on one side surface to face the milling cutter, the milling feeding mechanism chamfers the end edge, when finishing chamfering the end edge on one side surface, the first rotating member rotates the metallic member along the second direction downward, the second rotating member rotates the metallic member along the third direction to change position of the metallic member relative to the milling cutter, until the milling cutter arrives at an adjacent side surface to the side surface which the milled end edge located on, then the first rotating member rotates the metallic member along the second direction upward to enable the end edge on the adjacent side surface to face the milling cutter, such that the milling cutter chamfers the end edge.

14. The method of claim 12, wherein the worktable further comprises a third rotating member, the first rotating member is mounted on the third rotating member, in the step (9), the first rotating member rotates the metallic member along the second direction upward to enable the end edge on one side surface to face the milling cutter, the milling feeding mechanism chamfers the end edge, when finishing chamfering the end edge on one side surface, the first rotating member rotates the metallic member along the second direction downward, then the milling cutter moves to an adjacent side surface to the side surface which the milled end edge located on, the third rotating member rotates the metallic member along the first direction upward, until the end edge on the adjacent surface face the milling cutter, such that the milling cutter chamfers the end edge.

15. The method of claim 12, the worktable comprises a pair of mounting bases and a rotating shaft, the pair of mounting bases is spaced from each other and mounted on the machine support, the first rotating member is mounted on one mounting base, the rotating shaft interconnects the first rotating member and the other mounting base, the second rotating member is mounted on rotating shaft, the first rotating member is capable of rotating the rotating shaft, thereby rotating the second rotating member and the metallic member along the third direction.

16. The method of claim 10, wherein the lathe feeding mechanism further comprises a sliding saddle and a mounting seat fittingly assembled to the sliding saddle, the sliding saddle is slidably connected to the moving device along the second direction, the at least one feeding assembly is received in the mounting seat, and the milling cutter is slidably mounted on the mounting seat.

17. The method of claim 10, wherein the lathe feeding mechanism further comprises a sliding saddle and a mounting seat, the sliding saddle is slidably connected to the moving device along the second direction, the mounting seat is slidably mounted on the sliding saddle along a fourth direction substantially parallel to the third direction, the at least one feeding assembly is received in the mounting seat, and the milling cutter is mounted on the mounting seat; step (4) further comprises after the lathe tool arrives at the metallic member, the mounting seat is controlled to drive the lathe tool to move along the fourth direction to reach a preset position near the metallic member, then the lathe tool moves backwards and forwards.

18. A milling method for machining metallic member using lathing and milling, comprising:

(1) providing a machine comprising a machine support, a worktable, a moving device, a lathe feeding mechanism, and a milling feeding mechanism, wherein the worktable is positioned on the machine support; the moving device is slidably assembled to the machine support along a first direction and located above the worktable, the lathe feeding mechanism and the milling feeding mechanism are slidably assembled to the moving device along a second direction perpendicular to the first direction, the lathe feeding mechanism comprises at least one feeding assembly and a lathe tool connected to the at least one feeding assembly, the at least one feeding assembly is configured for driving the lathe tool to move along a third direction substantially perpendicular to the first and second direction reciprocally, the milling feeding mechanism comprises a milling cutter and is configured for driving the milling cutter to move along the third direction;

(2) positioning a metallic member on the worktable, the metallic member comprising a top portion and a peripheral sidewall extending from a peripheral edge of the top portion, the peripheral sidewall comprising an end edge away from the top portion;

(3) applying the worktable to rotate with the metallic member;

(4) controlling the lathe tool to move backwards and forwards toward the metallic member to machine the top portion of the metallic member circumferentially, wherein the moving device firstly drives lathe tool to move along the first direction until the lathe tool arrives at an end of a side of the top portion of the metallic member, and then the moving device drives lathe tool to move along the second direction until the lathe tool arrives at a middle of the side of the top portion of the metallic member, then the lathe tool moves backwards and forwards toward the metallic member to machine the top portion of the metallic member;

(5) moving the lathe tool by the moving device along a predetermined path relative to the worktable to machine curved surfaces of the top portion of the metallic member;

(6) holding the metallic member to stop rotate, and moving the lathe tool away from the metallic member;

(7) driving the milling cutter to rotate and contact the peripheral sidewall of the metallic member;

(8) moving the milling cutter along a predetermined path, simultaneously controlling a feed of the milling cutter relative to the metallic member; and (9) applying the worktable to rotate the metallic member to enable the end edge of the peripheral sidewall to face the milling cutter, and chamfering the end edge by the milling cutter along a predetermined path, simultaneously controlling a feed of the milling cutter relative to the metallic member.

19. The method of claim 18, wherein in step (5) the moving device moves the lathe tool along the first direction till the lathe tool arrives at a rotating center of the metallic member.

* * * * *